United States Patent [19]
Yasuda

[11] Patent Number: 6,144,908
[45] Date of Patent: Nov. 7, 2000

[54] APPARATUS AND METHOD FOR CONTROLLING YAW RATE OF AUTOMOTIVE VEHICLE

[75] Inventor: Sota Yasuda, Kanagawa, Japan

[73] Assignee: Nissan Motor Co., Ltd., Yokohama, Japan

[21] Appl. No.: 09/190,440

[22] Filed: Nov. 13, 1998

[30] Foreign Application Priority Data

Nov. 14, 1997 [JP] Japan .................................. 9-313247

[51] Int. Cl.$^7$ ........................................................ B62D 6/00
[52] U.S. Cl. ............................................. 701/41; 180/445
[58] Field of Search ................................. 701/41, 72, 82, 701/43; 303/140, 146; 180/445, 446

[56] References Cited

U.S. PATENT DOCUMENTS

| | | | |
|---|---|---|---|
| 5,018,594 | 5/1991 | Takahashi et al. | 180/412 |
| 5,032,996 | 7/1991 | Shiraishi | 701/41 |
| 5,121,322 | 6/1992 | Shiraishi et al. | 701/41 |
| 5,203,420 | 4/1993 | Shiraishi | 180/400 |
| 5,283,740 | 2/1994 | Sato et al. | 701/43 |
| 5,311,432 | 5/1994 | Momose | 701/41 |
| 5,343,393 | 8/1994 | Hirano et al. | 701/41 |
| 5,386,365 | 1/1995 | Nagaoka | 701/44 |
| 5,616,864 | 4/1997 | Johnson et al. | 73/504.04 |

FOREIGN PATENT DOCUMENTS 3-61173  3/1991  Japan .

*Primary Examiner*—Michael J. Zanelli
*Attorney, Agent, or Firm*—Foley & Lardner

[57] ABSTRACT

In an apparatus and method for controlling a yaw rate of an automotive vehicle, a correction of a steering angular sensor detected absolute value of a steering angular displacement of a steering wheel of the vehicle is made by means of a controller by a correction variable for an offset of the neutral steered point to a real neutral steered point by a correction using which the detected absolute value of the steering angular displacement corresponds to the real neutral steered point and indicates zero at the neutral steered point to derive a neutral point corrected steering angle, determination of a target yaw rate of the vehicle on the basis of the neutral point corrected steering angular displacement is made, and a motion of the vehicle as a yaw rate control is controlled so as to achieve the target yaw rate, a determination of whether a variation rate of the neutral point offset correction variable is equal to or above a predetermined variation rate during a predetermined control period is made, and a suppression of the yaw rate control is carried out while determining that the variation rate of the neutral point offset correction variable is equal to or above the predetermined variation rate. In a preferred embodiment, a reduction of the yaw rate is carried out to suppress the yaw rate control.

16 Claims, 5 Drawing Sheets

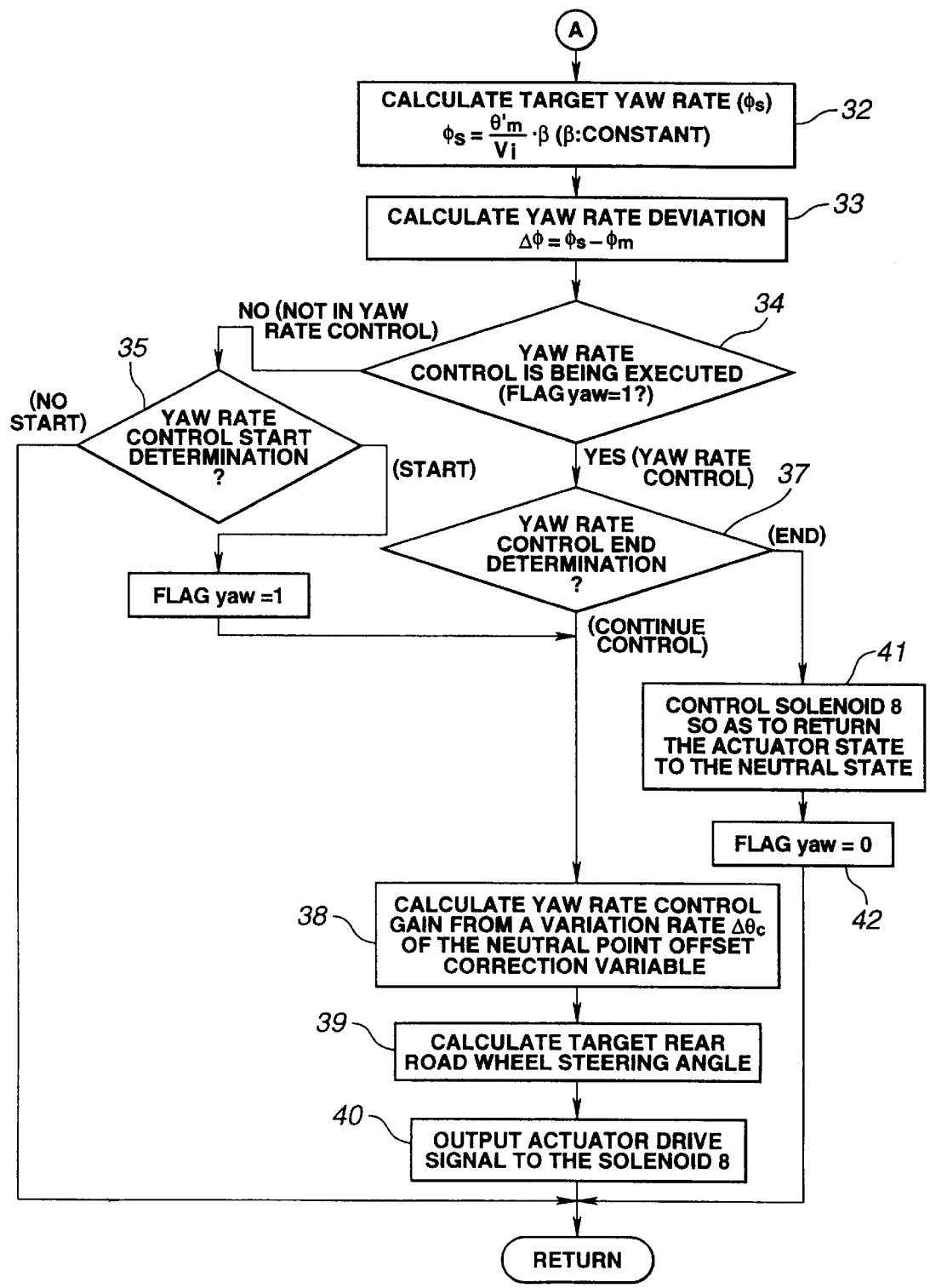

APPARATUS AND METHOD FOR CONTROLLING YAW RATE OF AUTOMOTIVE VEHICLE

The contents of the Application No. Heisei 9-313247, with the filing date of Nov. 14, 1997 in Japan, are herein incorporated by reference.

BACKGROUND OF THE INVENTION a) Field of the Invention

The present invention relates to apparatus and method for controlling a yaw rate of an automotive vehicle. The present invention especially relates to the apparatus and method for controlling the yaw rate of the automotive vehicle in which a neutral point offset correction is made in a case where a detected absolute value of a steering angular displacement of a steering angle sensor is incorrect.

b) Description of the Related Art

In general, it is indispensable for detecting a Steering angular displacement caused by a steering operation through a steering wheel of an automotive vehicle as far as a yaw rate control of the automotive vehicle is concerned.

Hence, the yaw rate control apparatus is usually provided with a steering angle sensor which detects an absolute steering angular displacement with respect to a neutral steered position at which the vehicle runs straightly.

It is often the case where the detected value of the steering angular displacement by means of the steering angle sensor does not accurately correspond to the absolute steering angular displacement with respect to the neutral steered position at which the vehicle runs straightly due to an assembly error of the steering angle sensor when assembled onto a steering system of the vehicle, due to different steering angle sensors having different characteristics, and/or due to an environmental temperature variation.

In this case, the yaw rate control becomes inaccurate and the vehicle motion becomes unstable.

A Japanese Patent Application First Publication No. Heisei 3-61173 published on Mar. 15, 1991 exemplifies a previously proposed neutral point correction technique in which an estimated value of a neutral steering angle is calculated when the detected absolute value of the steering angular displacement is within a predetermined range over a running distance of the vehicle equal to or more than a preset running distance and this calculation condition becomes more strict than an initial calculation condition so that an accuracy of estimating the neutral steering angle can be improved.

SUMMARY OF THE INVENTION

However, in the previously proposed neutral point correction technique disclosed in the above-identified Japanese Patent Application First Publication, in a case where the neutral point is largely deviated from its real neutral point and the correction of the neutral point cannot be completed by only one calculation, the yaw rate control based on the inaccurate detected value of the steering angular displacement is carried out before the correction of the neutral point is completed so that the vehicular motion becomes unstable.

This problem cannot completely be overcome by the disclosed neutral point correction technique.

It is, therefore, an object of the present invention to provide apparatus and method for controlling a yaw rate for an automotive vehicle which can avoid the motion of the automotive vehicle from becoming unstable before the correction of the neutral steered point offset on the detected value of the steering angular displacement is completed.

The above-described object can be achieved by providing an apparatus for an automotive vehicle. The apparatus comprises: a steering angle sensor for detecting at least an absolute value of a steering angular displacement of a steering wheel of the vehicle with respect to a neutral steered point at which the vehicle runs straight; and a controller for correcting the detected absolute value of the steering angular displacement of the steering wheel by a correction variable for an offset of the neutral steered point to a real neutral steered point by a correction using which the detected absolute value of the steering angular displacement corresponds to the real neutral steered point and indicates zero at the neutral steered point to derive a neutral point corrected steering angle, for determining a target yaw rate of the vehicle on the basis of the neutral point corrected steering angular displacement, for controlling a motion of the vehicle as a yaw rate control so as to achieve the target yaw rate, for determining whether a variation rate of the neutral point offset correction variable is equal to or above a predetermined variation rate during a predetermined control period, and for suppressing the yaw rate control while determining that the variation rate of the neutral point offset correction variable is equal to or above the predetermined variation rate.

The above-described object can also be achieved by providing a method for controlling a yaw rate of an automotive vehicle. The method comprises the steps of: detecting at least an absolute value of a steering angular displacement of a steering wheel of the vehicle with respect to a neutral steered point at which the vehicle would run straight; correcting the detected absolute value of the steering angular displacement of the steering wheel by a correction variable for an offset of the neutral steered point to a real neutral steered point by a correction using which the detected absolute value of the steering angular displacement corresponds to the real neutral steered point and indicates zero at the neutral steered point to derive a neutral point corrected steering angle; determining a target yaw rate of the vehicle on the basis of the neutral point corrected steering angular displacement; controlling a motion of the vehicle as a yaw rate control so as to achieve the target yaw rate; determining whether a variation rate of the neutral point offset correction variable is equal to or above a predetermined variation rate during a predetermined control period; and suppressing the yaw rate control while determining that the variation rate of the neutral point offset correction variable is equal to or above the predetermined variation rate.

BRIEF DESCRIPTION OF THE DRAWINGS

FIGS. 2A and 2B are integrally operational flowchart for explaining an operation of the yaw rate control apparatus in the preferred embodiment shown in FIGS. 1A and 1B.

BEST MODE FOR CARRYING OUT THE INVENTION

Reference will hereinafter be made to the drawings in order to facilitate a better understanding of the present invention.

Figure 1A:
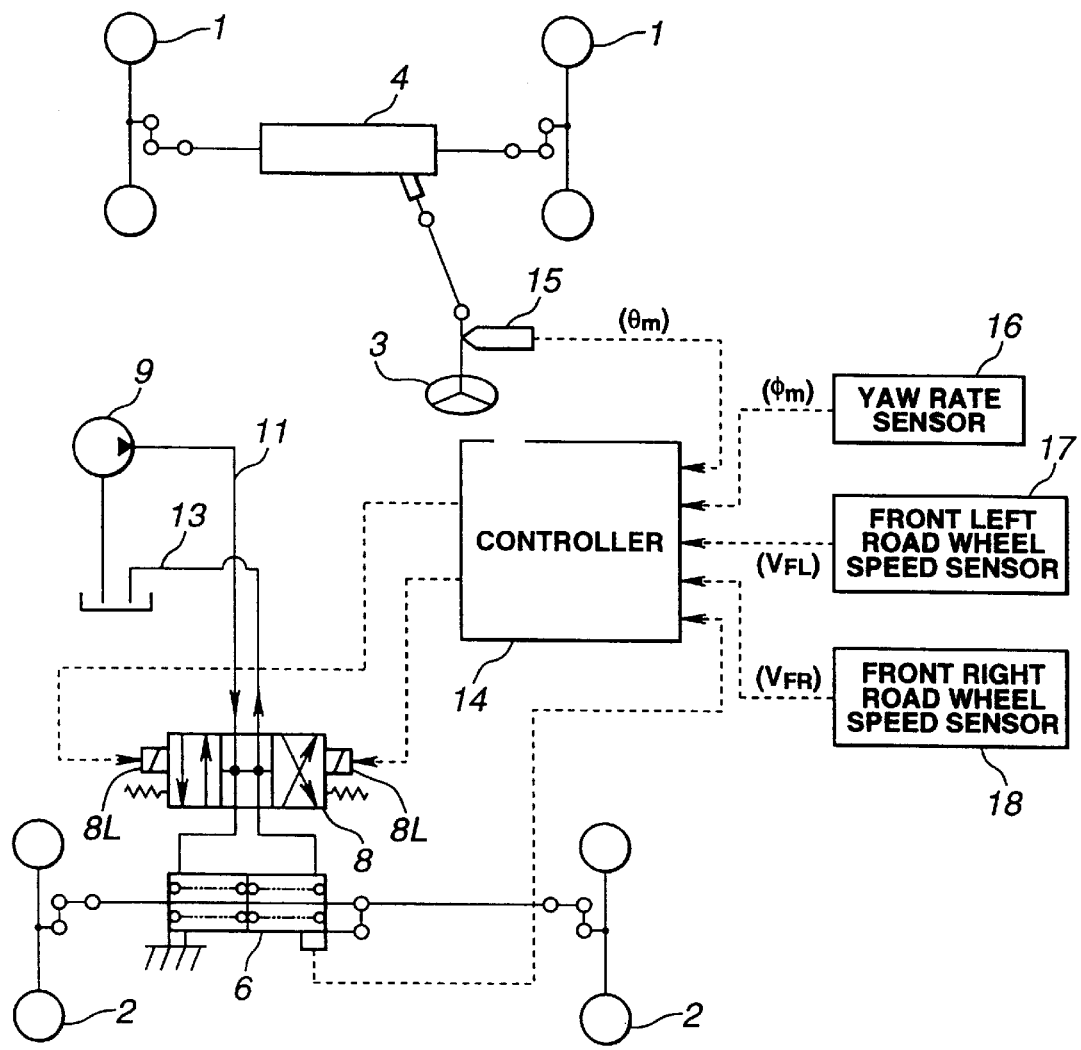
FIG. 1A is a whole system configuration of a rear road wheel steering system of an automotive vehicle to which a yaw rate controlling apparatus in a preferred embodiment according to the present invention is applicable.

FIG. 1A shows a schematic system configuration of an automotive vehicle steering system to which a preferred embodiment of a yaw rate control apparatus according to the present invention is applicable.

In the preferred embodiment, a target value of a vehicular yaw rate is achieved by a steering operation of rear road wheels.

In FIG. 1A, front left and right road wheels are denoted by 1 and rear left and right road wheels are denoted by 2.

The front left and right road wheels 1 are integrally steered by means of a steering wheel 3 via a steering gear 4 (a steering angle of each front road wheel is θ/N when a steering gear ratio is N). Each rear road wheel is enabled to be steered by means of an actuator 6.

The rear road wheel steered actuator 6 is normally axially supported at a neutral position by means of a built-in spring so as to maintain a read road wheel steering angle at zero.

When a hydraulic pressure is applied to either of two cylinder chambers of the actuator 6, the rear road wheels are steered in a direction corresponding to one pressure applied cylinder.

An electromagnetic valve 8 carries out a hydraulic pressure supply to each cylinder chamber of the actuator 6.

A hydraulic pressure circuit 11 connected to a pressure source constituted by a pump 9 is connected to the electromagnetic valve 8 and a drain circuit 13 is connected thereto.

The electromagnetic valve 8 is a three-position valve. The electromagnetic valve 8 has two mutually opposed solenoids 8L and 8R.

When both solenoids 8L and 8R are turned to OFF, the hydraulic pressures in the respective two cylinder chambers are drained from the circuit 13 to indicate zero rear road wheel steering angle.

When the solenoid 8L is turned to ON, the hydraulic pressure according to a time duration during which the solenoid 8L is continued to be turned to ON is supplied to the corresponding one of the two cylinder chambers of the actuator 6 so that the actuator 6 is stroked in a corresponding direction by a corresponding distance. Thus, the rear road wheels 2 are steered in a left direction as viewed from FIG. 1A by a corresponding steering angle.

When the solenoid 8R is turned to ON, the hydraulic pressure according to a time duration during which its solenoid 8R is continued to be turned to ON is supplied to the actuator corresponding one of the two cylinder chambers. Thus, each rear road wheel 2 is steered in a rightward direction by the corresponding steering angle.

A controller 14 carries out the turn ON or OFF of either or both of the solenoids 8L and 8R, namely, the rear road wheel steering angle.

Hence, the controller 14 receives signals from a steering angle sensor 15 which detects a steering angular displacement θ of a steering wheel 3 (the detected steering angle value is denoted by θm), from a yaw rate sensor 16 which detects a yaw rate φ acted upon the vehicle (the detected value of the yaw rate is denoted by φm), from a road wheel speed sensor 17 which detects a road wheel speed $V_{FL}$ of the front left road wheel (FL), and from another road wheel speed sensor 18 which detects a road wheel speed $V_{FR}$ of the front right road wheel (FR).

Figure 1B:
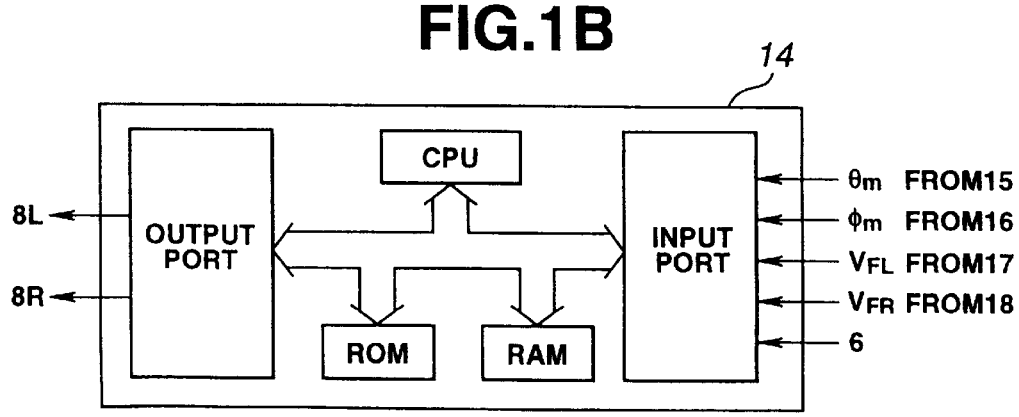
FIG. 1B is a circuit block diagram of a controller shown in FIG. 1A.

FIG. 1B shows a detailed structure of the controller 14.

That is to say, the controller 14 includes a CPU (Central Processing Unit), a ROM (Read Only Memory), a RAM (Read Only Memory), an Input Port, an Output Port, and a common bus.

Figure 2A:
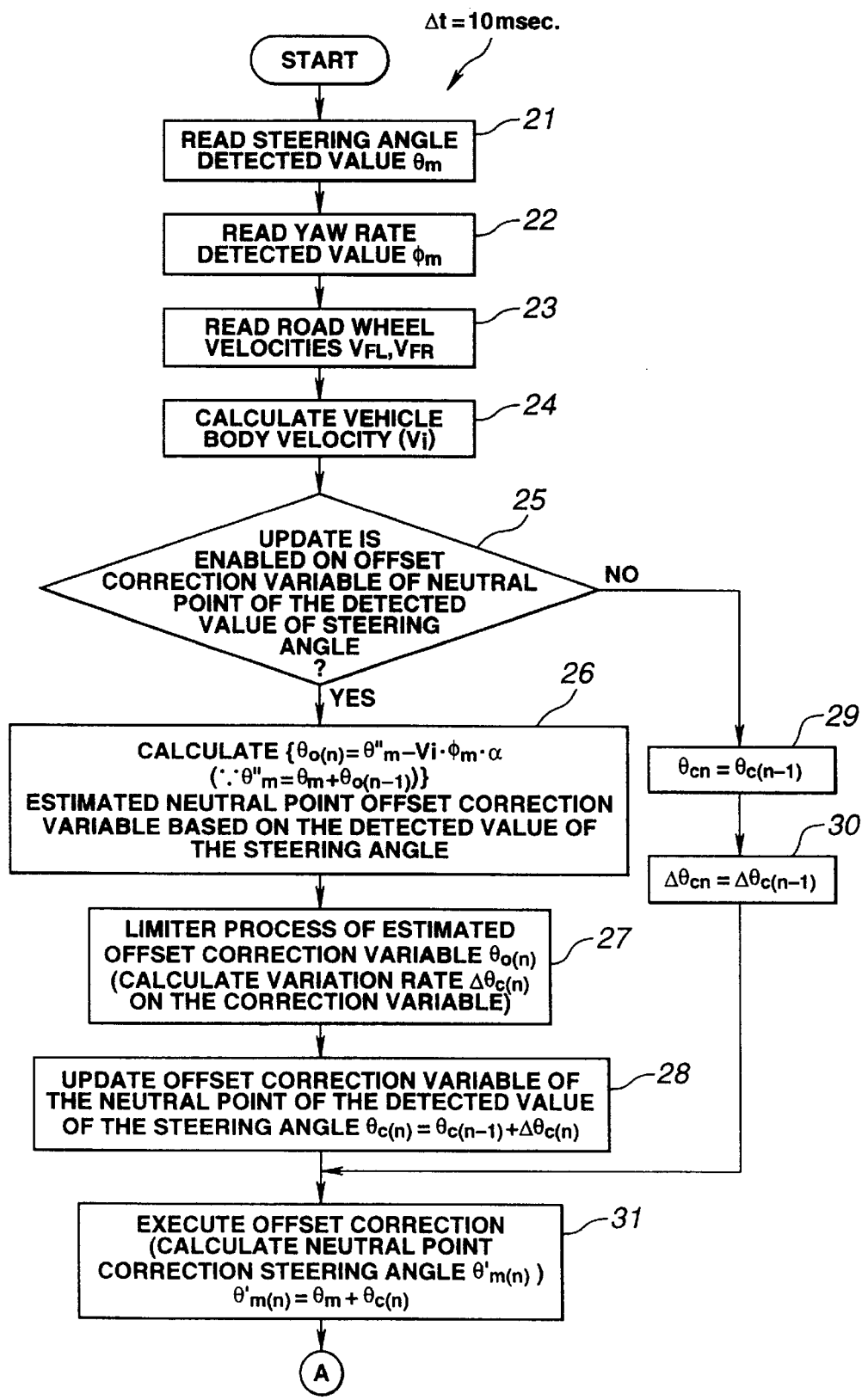

FIGS. 2A and 2B integrally show a control program executed in the controller 14 for each constant (predetermined control) cycle Δt (for example, 10 msec.) to carry out a neutral point offset correction of the steering angle detected value θm and a yaw rate control of the automotive vehicle based on the neutral point offset correction for the detected value θm of the steering angle.

At a step 21 of FIG. 2A, the CPU of the controller 14 reads the present detected value of the steering angle θm.

At the subsequent step 22, the CPU of the controller 14 reads the present detected value φm of the actual yaw rate.

At the subsequent step 23, the CPU of the controller 14 derives a vehicle body velocity Vi according to a calculation of $(V_{FL}+V_{FR})/2$ from the front left and right road wheel velocities $V_{FL}$ and $V_{FR}$ of the automotive vehicle (in a rear-road-wheel driven vehicle).

It is noted that the vehicle body velocity Vi may be calculated in the same way as the case of deriving a pseudo vehicle speed in an anti-skid control system.

At a subsequent step 25, the CPU of the controller 14 determines whether the vehicle is running in such a stable condition as to be enabled to update the correction variable of the neutral point offset on the detected value (θm) of the steering angle depending upon whether, for example, the detected value of the yaw rate θm satisfies the following equation:

$$\phi m \approx (\phi m / Vi) k \quad (1).$$

Since the determination of the stable vehicular running condition is in the vehicle straight running state, the CPU of the controller 14 may determine that the vehicle is running stably in such a state as to update the neutral point offset correction variable of the detected value of the steering angle when $|V_{FL}+V_{FR}|$ is equal to or below, for example, 0.5 km/h.

Or alternatively, the CPU of the controller 14 may determine that the vehicle is running stably in such the state as to enable an update of the correction variable of the neutral point offset on the detected value of the steering angle when the detected value |θm| of the steering angle is extremely small and when the detected value of the yaw rate φm is extremely small.

If YES at the step 25, the routine goes to a loop of steps 26 through 28.

In details, at the step 26, the CPU of the controller 14 calculates a presently estimated neutral point offset correction variable θ0(n) according to the following equation in which an estimated steering angle derived according to (Vi*φm*α, α denotes a constant) is subtracted from θm" which is an addition result of the detected value θm of the steering angle to the correction variable θ0(n−1) of the previously estimated neutral point offset correction variable.

$$\theta 0(n)=\theta m''-(Vi*\phi m*\alpha) \quad (2),$$

wherein $\alpha$ denotes a constant and $\theta m''=\theta m+\theta 0(n-1)$.

At the step 27, the CPU of the controller 14 carries out a limiter processing (described below) of the presently estimated neutral point offset correction variable shift $\theta 0(n)$ to derive a variation rate $\Delta\theta c(n)$ of the neutral steered point offset correction variable during one calculation period of the neutral point offset correction variable.

① when $\theta 0(n)-\theta 0(n-1) \geq \Delta\theta cmax$ (constant), $\Delta\theta c(n)=\Delta\theta cmax$.

② when $\theta 0(n)-\theta 0(n-1) \leq \Delta\theta cmin$ (constant), $\Delta\theta c(n)=\Delta\theta cmin$.

③ when $\Delta\theta cmin < \theta 0(n)-\theta 0(n-1) < \Delta\theta cmax$, $\Delta\theta c(n)=\theta 0(n)-\theta 0(n-1)$.

It is noted that the variation rate $\Delta\theta c(n)$ of the correction variable of the neutral point offset from the real neutral steered point can be carried out by passing the present neutral steered point offset correction variable shift $\theta 0(n)$ of the neutral point through a first order lag filter.

$$\Delta\theta c(n)=\Delta\theta c(n-1)+\{[(\theta 0(n)-\theta 0(n-1))/2]-\Delta\theta c(n-1)\}/4 \quad (3)$$

At the step 28, if the CPU of the controller 13 adds the variation rate $\Delta\theta c(n)$ of the correction variable of the neutral steered point to the previous correction variable $\theta c(n-1)$ of the neutral point offset on the detected value of the steering angular displacement as follows:

$$\theta c(n)=\theta c(n-1)+\Delta\theta c(n) \quad (4).$$

At a step 31, the CPU of the controller 14 executes the offset correction variable to derive the neutral point correction steering angle $\theta m(n)'$ by the following calculation in which the detected value $\theta m$ of the steering angle is corrected by the present offset correction variable $\theta c(n)$ on the detected value of the present steering angle.

$$\theta m(n)'=\theta m+\theta c(n) \quad (5).$$

At a step 32 of FIG. 2B, a target yaw rate $\phi s$ is calculated from the neutral steered point corrected steering angle $\theta m(n)'$ and the vehicle body speed (velocity) Vi as follows:

$$\phi s=(\theta m(n)'/Vi)\beta \quad (6),$$

wherein $\beta$ denotes a constant.

The target yaw rate $\phi s$ derived in this equation (6) represents the yaw rate to be the target according to the corrected steering angle $\theta m(n)'$ of the neutral steered point.

However, any arbitrary target yaw rate $\phi s$ may be adopted.

At a step 33, a deviation $\Delta\phi$ of the detected value $\phi m$ of the yaw rate with respect to the target yaw rate $\phi s$ is derived as follows:

$$\Delta\phi=\phi s-\phi m \quad (7).$$

At a step 34, the CPU of the controller 14 determines whether the present time is being under the yaw rate control depending upon whether a yaw rate control flag FLAGyaw has already been set to "1".

Figure 3:
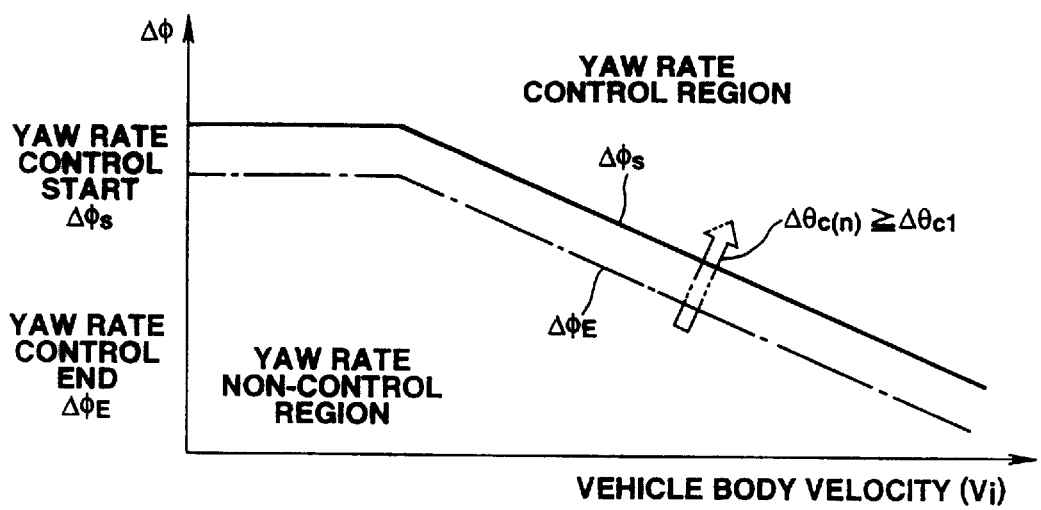
FIG. 3 is a map representing a characteristic graph of a yaw rate control region and no yaw rate control region used in the preferred embodiment or its alternative.

If the yaw rate control is not being carried out at the step 34 (NO), the CPU of the controller 14 retrieves a set value $\Delta\phi s$ of the yaw rate deviation to start the yaw rate control from the vehicle body speed (velocity) Vi using a map corresponding to a solid line in FIG. 3 and determines whether the yaw rate control should be initiated or not depending on whether the yaw rate deviation $\Delta\phi$ is equal to or above the yaw rate deviation set value $\Delta\phi s$.

If the CPU of the controller 14 determines that the yaw rate control should not be initiated (NO) at the step 35, the present routine is ended.

If the CPU of the controller 14 determines that the yaw rate control should be initiated (Yes) at the step 35, the routine goes to a step 36 in which FLAGyaw=1 in order to start the yaw rate control.

Figure 4:
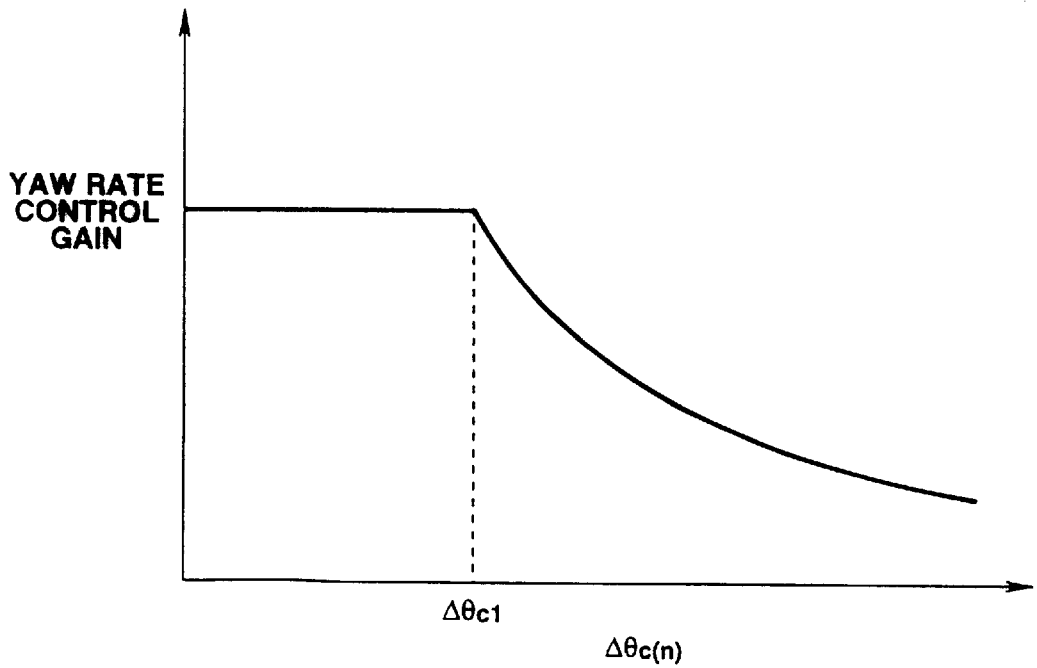
FIG. 4 is a map representing a characteristic graph of a yaw rate control gain with respect to a variation rate of a neutral steered point offset correction variable used in the preferred embodiment shown in FIGS. 1A and 1B.

At a step 38, the CPU of the controller 14 retrieves a control gain of the yaw rate control from a map shown in FIG. 4 using the variation rate $\Delta\theta c(n)$ during one calculation cycle of the correction variable of the neutral point described above.

The control gain characteristic shown in FIG. 4 is such that a value $\Delta\theta c1$ corresponding to a lowest limit value of the correction variable of the neutral point offset by which one cycle control cannot correct the neutral steered point is set as a boundary and in a region in which the above-described variation rate $\Delta\theta c(n)$ is larger than the preset variation rate $\Delta\theta c1$ which corresponds to the lowest value of the neutral steered point offset correction variable, the control gain of the yaw rate is reduced as the variation rate $\Delta\theta c(n)$ is increased.

At the next step 39, the CPU of the controller 14 calculates a target rear road wheel steering angle to coincide with the actual yaw rate $\phi m$ with the target yaw rate $\phi s$.

At a step 40, the CPU of the controller 14 outputs an actuator drive signal to steer the rear road wheels toward the target rear road wheel steering angle to the electromagnetic valve solenoid 8L or 8R so as to execute a desired yaw rate control.

In the preferred embodiment, while the variation rate $\Delta\theta c(n)$ of the correction variable of the neutral point offset during the yaw rate control period is equal to or greater than the preset variation rate $\Delta\theta c1$, the yaw rate control gain is reduced. Hence, in a case where the offset correction variable of the neutral point on the detected value $\theta m$ of the steering angle is not completed only by the once control routine, namely, before the above-described correction is completed, the yaw rate control is suppressed. Consequently, the suppression of the yaw rate control permits the avoidance of the unstable motion of the vehicle due to the normally carried out yaw rate control using the incorrect neutral point corrected steering angle $\theta m(n)'$.

It is noted that the yaw rate control is suppressed by the reduction in the yaw rate control gain. Alternatively or together with the reduction in the yaw rate control gain, while the variation rate $\Delta\theta c(n)$ of the correction variable of the neutral point offset during the control period of the yaw rate is equal to or above the preset variation rate $\Delta\theta c1$, as denoted by a phantom lined arrow mark in FIG. 3, the characteristic of FIG. 3 may be varied so that the yaw rate control region becomes narrower. The same object can be achieved.

Referring back to FIG. 2B, at a step 34, the CPU of the controller 14 determines that the yaw rate control flag FLAGyaw has already set to "1" (Yes), namely, determines that the yaw rate control is being carried out, the routine goes to a step 37 in which the CPU of the controller 14 retrieves the yaw rate deviation set value $\Delta\phi E$ for the yaw rate control to be finished from a map corresponding to a dot-and-dash line of FIG. 3 using the vehicle body velocity Vi. The CPU of the controller 14, at the step 37, determines whether the yaw rate deviation $\Delta\phi$ is below the preset value (yaw rate deviation set value) $\Delta\phi E$.

If the CPU of the controller 14 does not determine that the yaw rate control should be ended (Continue Control) at the step 37, the yaw rate control is continued at the steps 28 through 40.

On the other hand, if the CPU of the controller 14 determines that the yaw rate control should be ended, the routine goes to a step 41 in which the solenoid 8L or 8R of the electromagnetic valve 8 is controlled so that the actuator 6 is in the neutral state and the rear road wheel steering angle is zeroed with the neutral state of the actuator 6.

At the next step 42, the CPU of the controller 14 resets the yaw rate control flag FLAGyaw to zero and the present routine is ended.

It is noted that the yaw rate sensor 16 described in the preferred embodiment is exemplified by a U.S. Pat. No. 5,616,864 issued on Apr. 1, 1997, the disclosure of which is herein incorporated by reference.

Figure 5:
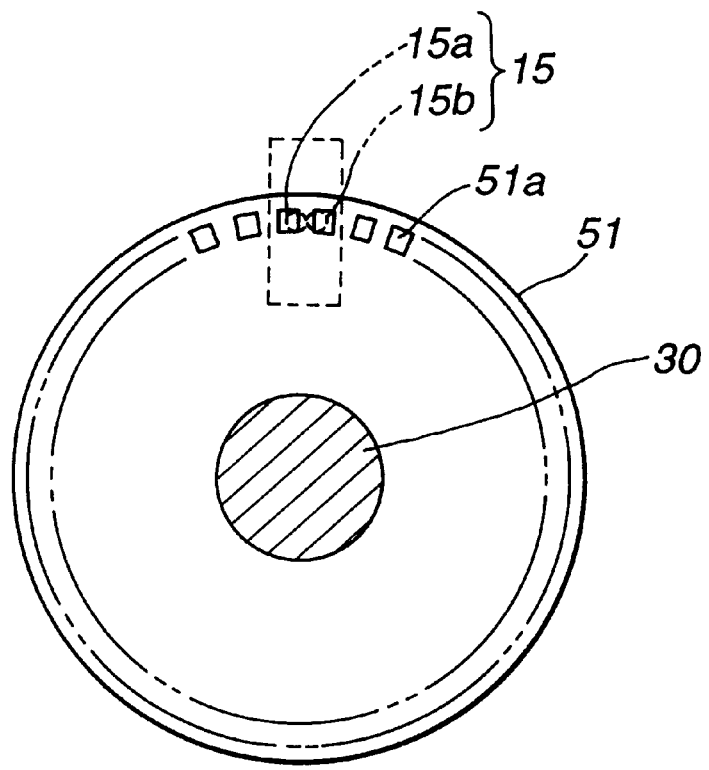
FIG. 5 is a structural view of a steering angle sensor used in the preferred embodiment shown in FIGS. 1A and 1B.
Figure 6A:
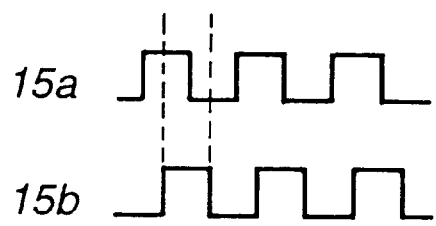
FIGS. 6A and 6B are output signals of first and second sensor portion of the steering angle sensor used in the preferred embodiment shown in FIG. 5 to detect a steering direction of a steering wheel, respectively.
Figure 6B:
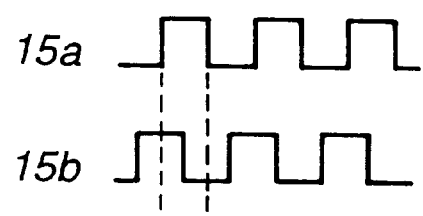

It is also noted that FIGS. 5, 6A, and 6B show an example of the steering angle sensor 15 used in the preferred embodiment and output signals of the steering angle sensor 15.

As shown in FIG. 5, a sensor disk 51 is attached about a steering shaft 30 a steering system of the vehicle and which is rotated together with the steering wheel. A plurality of slits 51a are provided at equal intervals of degrees over the whole peripheral surfaces of the sensor disk 51. Two pairs of photo diodes and photo ICs are arranged at a half pitch interval corresponding to the slits 51a, a first pair of the photo diode and the photo IC constituting a first sensor portion 15a of the steering angle sensor 15 and a second pair of the photo diode and the photo IC constituting a second sensor portion 15b of the steering angle sensor 15. The controller 14 counts the number of pulses from one of the first and second sensor portions 15a and 15b to detect the steering angular displacement according to the steering movement of the steering wheel 3 and detects a steering direction according to a phase difference between the output pulse waveforms of the first and second sensor sections 15a and 15b, as shown in FIG. 6A and in FIG. 6B.

It is noted that the previously estimated neutral steered point offset correction variable θ0(n) is derived from the equation (2) when the vehicle is running in such a stable state as to enable the update of the neutral steered point offset correction variable θc(n) and the present neutral steered point offset correction variable θc(n) is derived from the equation (4) using the limiter processed or first order lag filter passed variation rate Δθc(n).

It is also noted that the suppression in the yaw rate control may be interpreted as a reduction in a sensitivity of the yaw rate control.

What is claimed is:

1. An apparatus for an automotive vehicle, comprising:

a steering angle sensor for detecting at least an absolute value of a steering angular displacement (θm) of a steering wheel of the vehicle with respect to a neutral steered point at which the vehicle runs straight; and a controller for correcting the detected absolute value of the steering angular displacement (θm) of the steering wheel by a correction variable for an offset of the neutral steered point to a real neutral steered point by a correction using the detected absolute value of the steering angular displacement (θm) which corresponds to the real neutral steered point and indicates zero at the neutral steered point to derive a neutral point corrected steering angle, for determining a target yaw rate of the vehicle on the basis of the neutral point corrected steering angular displacement, for controlling a motion of the vehicle as a yaw rate control so as to achieve the target yaw rate, for determining whether a variation rate of the neutral point offset correction variable is equal to or above a predetermined variation rate during a predetermined control period, and for suppressing the yaw rate control while determining that the variation rate of the neutral point offset correction variable is equal to or above the predetermined variation rate.

2. An apparatus for an automotive vehicle as claimed in claim 1, wherein the controller reduces a control gain of the yaw rate control so as to suppress the yaw rate control while determining that the variation rate of the neutral point offset correction variable is equal to or above the predetermined variation rate.

3. An apparatus for an automotive vehicle as claimed in claim 1, wherein the controller narrows a control region of the yaw rate control so as to suppress the yaw rate control while determining that the variation rate of the neutral point offset correction variable is equal to or above the predetermined variation rate.

4. An apparatus for an automotive vehicle as claimed in claim 1, wherein the predetermined variation rate of the neutral point offset correction variable corresponds to a lowest limit value of the neutral point offset correction variable by which the correction of the neutral point offset from the real neutral steered point is not completed during one predetermined control period.

5. An apparatus for an automotive vehicle as claimed in claim 2, wherein the controller narrows a control region of the yaw rate control so as to suppress the yaw rate control.

6. An apparatus for an automotive vehicle as claimed in claim 1, which further comprises a yaw rate sensor for detecting an actual yaw rate ($\phi m$) of the vehicle and a vehicle body velocity detector for detecting a vehicle body velocity (Vi) and wherein the controller further comprises a determinator for determining whether the vehicle is in such a stable running condition as to be enabled for the neutral point offset correction variable to be updated on the basis of at least one of a detected value of the actual yaw rate ($\phi m$) and the detected value of the steering angular displacement ($\theta m$).

7. An apparatus for an automotive vehicle as claimed in claim 6, wherein the controller further comprises a present neutral point offset correction variable calculator for calculating a presently estimated neutral point offset correction variable shift θ0(n) according to an estimated steering angular displacement based on the vehicle body velocity and the detected value of the actual yaw rate as follows:

θ0(n)=θm"−(Vi*$\phi$m*α), wherein α denotes a constant, θm"=θm+θ0(n−1), wherein θ0(n−1) denotes a previously estimated neutral point offset correction variable and a variation rate calculator for calculating the variation rate (Δθc(n)) of the neutral point correction variable on the basis of the presently and previously estimated neutral point correction variables (θ0(n), θ0(n−1)).

8. An apparatus for an automotive vehicle as claimed in claim 7, wherein the controller further comprises a neutral point corrected steering angle calculator for calculating a neutral point corrected steering angle (θm(n)') as follows: θm(n)'=θm+θc(n).

9. An apparatus for an automotive vehicle as claimed in claim 8, wherein the controller derives a deviation Δ$\phi$ of the detected value $\phi$m of the yaw rate from Δ$\phi$=$\phi$s−$\phi$m and determines whether the yaw rate deviation Δ$\phi$ is equal to or above a predetermined deviation Δ$\phi$s for determining whether the yaw rate control should be carried out.

10. An apparatus for an automotive vehicle as claimed in claim 9, wherein the controller derives the yaw rate control gain from a map using the variation rate $\Delta\theta c(n)$ of the neutral point offset correction variable during the predetermined control period when the yaw rate deviation $\Delta\phi$ is equal to or above the predetermined deviation ($\Delta\phi s$).

11. An apparatus for an automotive vehicle as claimed in claim 10, wherein the map indicates a characteristic such that the yaw rate control gain is reduced as $\Delta\theta c(n)$ is increased with the value ($\Delta\theta c1$) corresponding to the lowest value of neutral point offset correction variable by which the correction of the neutral point offset from the real neutral steered point is not completed during one predetermined control period as a boundary.

12. An apparatus for an automotive vehicle as claimed in claim 11, wherein the controller raises another predetermined yaw rate deviation ($\Delta\phi E$) used to determine whether the yaw rate control should be ended toward the predetermined yaw rate deviation ($\Delta\phi s$) so as to narrow the control region with respect to the vehicle body velocity (Vi).

13. An apparatus for an automotive vehicle as claimed in claim 12, wherein the controller derives a target rear road wheel steering angle to make the detected value of the actual yaw rate ($\phi m$) coincident with the target yaw rate ($\phi s$) and which further comprises a rear road wheel steering actuator for actuating rear road wheels of the vehicle to be steered in accordance with the target rear road wheel steering angle.

14. An apparatus for an automotive vehicle as claimed in claim 7, wherein the variation rate calculator calculates the variation rate of the neutral steered point offset correction variable as follows:

$\Delta\theta c(n)=\Delta\theta cmax$ when $\theta 0(n)-\theta 0(n-1)\geq \Delta\theta cmax$ ($\Delta\theta max$ denotes a constant);

$\Delta\theta c(n)=\Delta\theta cmin$ when $\theta 0(n)-\theta 0(n-1)\geq \Delta\theta cmin$ ($\Delta\theta min$ denotes a constant); and $\Delta\theta c(n)=\theta 0(n)-\theta 0(n-1)$ when $\Delta\theta cmin<\theta 0(n)-\theta 0(n-1)<\Delta\theta cmax$.

15. An apparatus for an automotive vehicle as claimed in claim 14, wherein the variation rate calculator calculates the variation rate of the neutral steered point offset variable as follows:

$\Delta\theta c(n)=\Delta\theta c(n-1)+\{[(\theta 0(n)-\theta 0(n-1))/2]-\Delta\theta c(n-1)\}/4.$ 16. A method for controlling a yaw rate of an automotive vehicle, the method comprising the steps of:

detecting at least an absolute value of a steering angular displacement of a steering wheel of the vehicle with respect to a neutral steered point at which the vehicle would run straight;

correcting the detected absolute value of the steering angular displacement of the steering wheel by a correction variable for an offset of the neutral steered point to a real neutral steered point by a correction using the detected absolute value of the steering angular displacement which corresponds to the real neutral steered point and indicates zero at the neutral steered point to derive a neutral point corrected steering angle;

determining a target yaw rate of the vehicle on the basis of the neutral point corrected steering angular displacement;

controlling a motion of the vehicle as a yaw rate control so as to achieve the target yaw rate;

determining whether a variation rate of the neutral point offset correction variable is equal to or above a predetermined variation rate during a predetermined control period; and suppressing the yaw rate control while determining that the variation rate of the neutral point offset correction variable is equal to or above the predetermined variation rate.

* * * * *